No. 881,641. PATENTED MAR. 10, 1908.
M. WEINRICH.
PROCESS OF TREATING SUGAR BEETS.
APPLICATION FILED MAY 14, 1907.
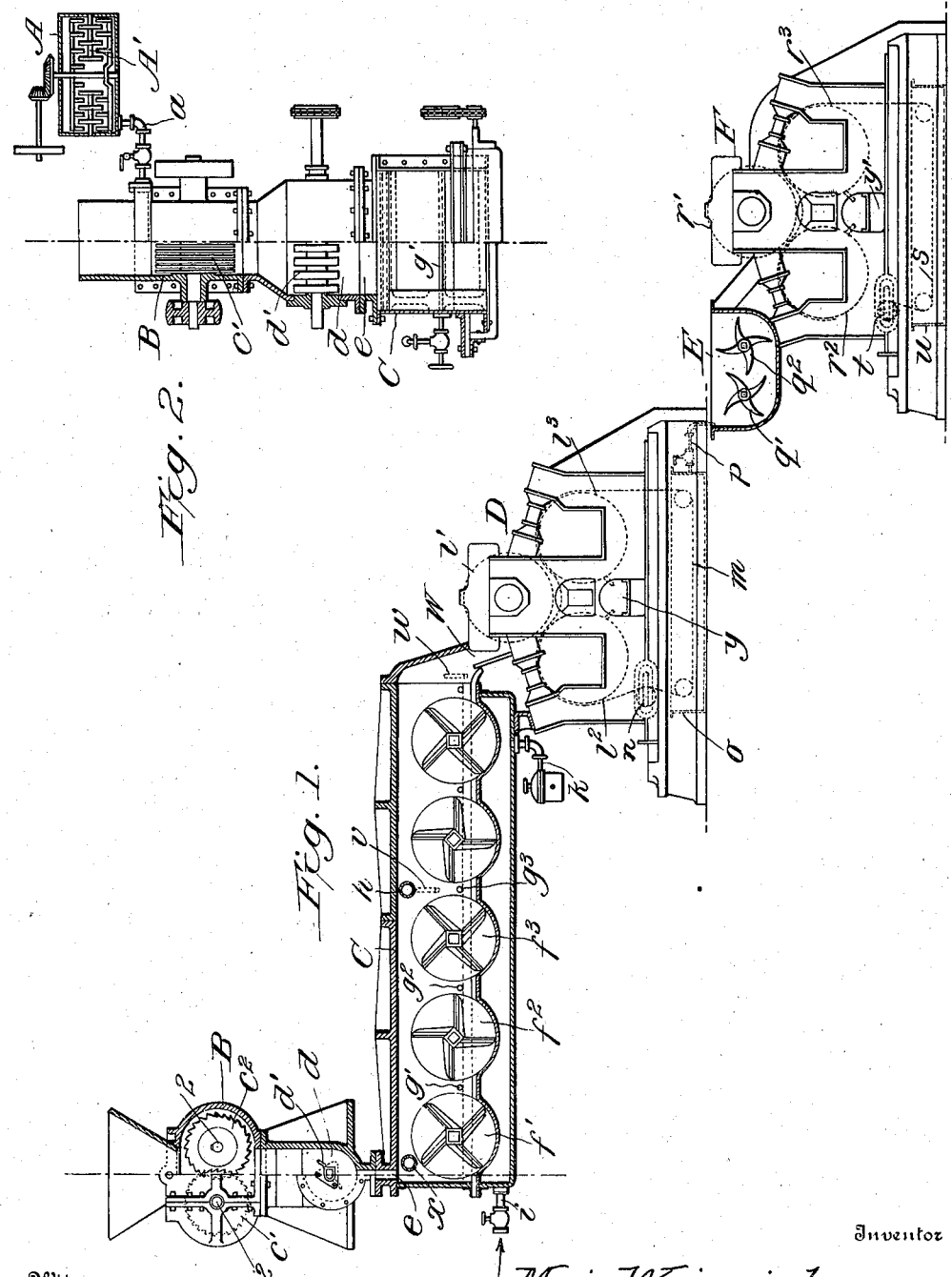
Witnesses
C. H. Walker
M. W. Darg
Inventor
Moriz Weinrich,
By J. Walter Fowler
His Attorney

UNITED STATES PATENT OFFICE.

MORIZ WEINRICH, OF YONKERS, NEW YORK, ASSIGNOR OF ONE-THIRD TO CARL PORTIUS, OF HALLE-ON-THE-SAALE, GERMANY.

PROCESS OF TREATING SUGAR-BEETS.

No. 881,641.      Specification of Letters Patent.      Patented March 10, 1908.

Application filed May 14, 1907. Serial No. 373,554.

*To all whom it may concern:*

Be it known that I, MORIZ WEINRICH, a citizen of the United States, residing at Yonkers, in the county of Westchester and State of New York, have invented new and useful Improvements in Processes of Treating Sugar - Beets, of which the following is a specification.

My invention relates to a certain new and useful process of treating sugar beets, by which the juice of such beets is not alone completely defecated before it is extracted, but it is also, during the same uninterrupted operation, completely neutralized and purified, thereby superseding the lime-kiln work, the carbonation, and the filter-press work, and simplifying, cheapening and accelerating the whole manufacturing process to a great extent.

In a prior patent, No. 803,945, dated November 7, 1905, I describe a process of treating sugar beets, or defecating the juice of sugar beets, before such juice is extracted; the present improvement not only defecates the juice before it is extracted, but the juice is also, during the same continuous operation, completely neutralized and purified to simplify and cheapen the process as a whole, and to thereby cheapen the manufactured product.

It is well known in the sugar industry that for precipitating those substances in raw beet sugar juices, which can be precipitated by lime, only about $\frac{1}{4}\%$ of lime (CaO) of the weight of the beets is required, and that for obtaining a bright juice with alkaline reaction, about $\frac{1}{2}\%$ of lime is needed. With the present mode of juice extraction, defecation and carbonation, the work on a large scale with this amount of lime is not feasible, because the defecation scum obtained thereby will not filter sufficiently quick. For this reason generally from $2\frac{1}{2}\%$ to $3\frac{1}{2}\%$ of lime is used, although it has never been proved that a greater purification of the juice is accomplished by this greatly increased and expensive application.

The object of the present invention is to attain by the use of only about $\frac{1}{2}\%$ of lime, not only the defecation of the juice in finely comminuted beets, but also a complete neutralization, purification and filtration in one, quick, continuous operation.

In the accompanying drawings I show, for illustrative purposes, one form of apparatus which can be used to good advantage in carrying out my process.

Figure 1 represents a part elevation and part sectional view. Fig. 2 is an end view partly in section.

Referring now to the aforesaid drawings for a better understanding of my improved process, A represents a tank of suitable construction and dimensions adapted to receive thin milk of lime, said tank being provided with an appropriate stirrer A' by which the milk of lime is thoroughly agitated. The tank is also provided with a pipe, $a$, which leads into the casing or shell of a rasping machine, B, said pipe, $a$, having the portion within the rasping machine perforated or otherwise constructed to deliver the milk of lime into the rasping machine and upon the beet mush therein.

The rasping machine may be of any appropriate type; it is herein shown as including a plurality of shafts, 2, upon which are fixed a number of closely-set circular saw blades, $c'$, $c^2$, said shafts being designed to be rotated in opposite directions and at different speeds, by any of the well known means; one of said shafts making say about 400 revolutions per minute and the other shaft having a higher speed, say about 600 revolutions per minute.

Suitably disposed below the rasping devices is a trough, $d$, in which is mounted a stirrer, $d'$, in which trough the beet mush, mixed with the lime milk, is falling continuously from the rasping devices above, said trough having a delivery passage which connects with the inlet or opening, $e$, of a heating chamber, C, of suitable construction, design, and capacity.

The heating chamber herein shown has a double bottom. The lower bottom is straight, and the upper bottom consists of a number of trays or segmental troughs in each of which a paddle-wheel or other conveyer, $f'$ $f^2$ $f^3$, etc., is adapted to turn. In practice, the shafts of the paddle-wheels will be provided with suitable means, as sprocket wheels, on their outer ends, whereby said paddle wheels will be turned in the same direction to advance the beet much more or less slowly and while it is warmed through the heating chamber, toward a roller press, D, at the delivery end of the chamber.

The space between the two bottoms of the heating chamber forms a steam chamber, steam entering this chamber through a suitable pipe, $i$, and leaving the chamber through a pipe, $k$. In addition to the beet-mush being warmed by the heat of this steam chamber, it is further heated by direct steam which is admitted into the mush through suitable perforated pipes, $g'$, $g^2$, $g^3$, etc., which pipes extend through the whole width of the heating chamber, which chamber may, if desired, be given a slight inclination towards its delivery end, where the roller press, D, is suitably located to receive the mush as it leaves the discharge chute, W, of the heating chamber.

A suitably perforated pipe, $x$, extends transversely across the heating chamber, and through this pipe some of the defecated and neutralized juice, coming from the first mill is entering continuously, for the purpose of thinning and warming up the beet mush to a certain degree, thereby accelerating the warming of the mush in the chamber, C. A second perforated pipe, $h$, also extends transversely across the heating chamber and through this pipe thin phosphoric acid is run continuously upon the limed beet mush, for the purpose of neutralizing its excess of lime. Suitable thermometers, $v$ and $w$, with elbows reaching through the walls of the heating chamber, afford a ready means for ascertaining the temperature of the beet mush at the points where the thermometers are located.

As before stated, a roller press, D, is located at the delivery end of the heating chamber, C, and the limed, heated and now neutralized beet mush enters this press through the chute or passage, W, said press being of any suitable type and herein shown as comprising three rollers, $l'$, $l^2$ and $l^3$, and an endless cloth, $m$, which passes over the two lower rollers and beneath the upper roller, the lower run of the cloth moving through a water receptacle, $o$, whereby said cloth is kept clean for a long time. The cloth may consist of some strong, closely-woven cotton fabric, so-called tarpaulin, and it is kept under proper tension and any looseness occurring therein at any time may be readily taken up by means of a suitable belt tightener, $n$.

The trough beneath the rasping devices in which the stirrer, $d'$, operates, the heating chamber, C, and the rollers, $l'$, $l^2$ and $l^3$, of the press, D, are preferably of equal width; and the roller press has its lower portion provided with a trough, $y$, into which runs the pressed juice which has passed through the meshes of the endless cloth.

The pressed pulp leaving the final roller, $l^3$, of the press, D, may undergo a second pressing in a mill or press, F, which second press is substantially like the press first described in that it comprises the three rollers, $r'$, $r^2$ and $r^3$, the endless cloth, $s$, the take-up, $t$, the water receptacle or trough, $u$, and the gutter or trough, $y'$.

When subjecting the pulp to a second pressing, the said pulp after leaving the final roller of the first press, may be directed into a mixer or shredder, E, where it is shredded by means of closely-set rotary knives, or shredders, $q'$, $q^2$, and water may be supplied continuously to this mixer or shredder from the tank or receptacle, $o$, through a pipe, $p$, for purpose of reducing the pulp to a fine mush, which is intimately mixed and then pressed again.

In working my process, the washed beets are delivered first into a slicing machine of suitable character, say one like those commonly used with the diffusion process, and are comminuted into slices. From the slicing machine the sliced beets drop into the rasping machine, B, whose knives tear the slices into a fine mush while thin milk of lime, or the juice from the aforesaid second press, F, in which lime has been slaked, is added constantly from the tank, A, through the pipe, $a$.

The amount of water, or thin juice, that shall be added in the shape of lime milk, shall amount to 25% to 30% of the weight of the beets; that is, 25% with beets whose juice shows up to 18° Brix, and 30% with richer beets. The amount of lime to be added in the lime milk shall be 0.4% to 0.5% of CaO of the weight of the beets. If the beets are poor or partly decayed, the dose shall be raised to about 2/3%. The milk of lime shall have a temperature not to exceed 25° C, because when adding hot milk of lime, some of the very detrimental pectin matters would become dissolved.

The trough, $d$, under the rasping machine, B, shall be large enough to retain the mush for a few minutes, so that an intimate mixing with the lime is attained.

The mush runs continuously through the passage, $e$, into the heating chamber, C. In order to thin it, and to accelerate thereby its heating through the double bottom, and the steam entering through pipes, $g^1$, $g^2$ and $g^3$ etc., some of the defecated and neutralized warm juice, coming from the first roller mill, shall be added constantly through the pipe, $x$. A sufficient thinning is attained by introducing about 25% of the defecated juice. The system of paddle wheels, $f^1$, $f^2 f^3$ etc., conveys the lime mush slowly toward the press, D.

The steam shall be regulated in such a way that the mush when reaching the point, $v$, where a thermometer and also the perforated pipe, $h$, is placed, shall have reached a temperature of 60° to 65° C. At this place phosphoric acid of about 10% is added uniformly through the pipe, $h$, upon the mush which is in a constantly rotary motion. The flow of the acid shall be regulated so that the juice coming from the roller mill shall show an alkalinity of only 0.04 to 0.06. This can be easily controlled on the spot inasmuch as some white phenophtalein paper when brought in contact with the juice shall show only a slight pink reaction.

When using phosphoric acid for neutralizing sugar solutions no re-dissolving of impurities will occur by going too low with the alkalinity, which is the case when carbonic acid gas is employed. Therefore, if desired, the alkalinity can be brought down lower than 0.04, and even to complete neutrality without affecting the purification. Before the mush drops at $w$, upon the roller mill, its temperature shall be brought to 70° to 75° C. Owing to the liming and the heating, all the cells of the mush will burst, and its juice becomes perfectly defecated and is brought to the desired alkalinity or neutrality and loses all its viscosity. Beet mush, when treated in this way can be pressed with the greatest ease. It drops in a uniform, thick layer on the roller mill and is pressed there in the well known way. The juice leaves the press almost clear by passing through the endless cloth, $m$, and runs off through the gutter, $y$.

The mush may be pressed more or less as desired, and thereby a pressed pulp obtained which contains accordingly more or less sugar. The pulp contains all the organic substances which the lime has precipitated and also the lime which had been neutralized by the phosphoric acid. Its feeding value is thereby very much increased, and the greater part of the expense for the phosphoric acid recovered.

With former processes, whose object was to defecate the juice in the beets, a strongly alkaline pulp was obtained, which was highly detrimental when fed to cattle, and whereby these processes became impracticable. With the present process, the pulp from the first press is faintly alkaline or neutral, and from the second press always neutral. With this process it is feasible to reduce the loss of sugar in the pulp to a minimum by a good second pressing. For this purpose, the pulp from the first press drops into the mixer or shredder, E, where it is mixed with 25% to 30% of water of the weight of the beets, which will run on continuously through pipe, $p$, from tank, $o$, by means of the closely-set mixing arms, $q'$, $q^2$, into a uniform mush, and then undergoes an energetic second pressing. In this way the final pulp can be brought down to 14% to 15% of the weight of the beets with about 50% of dry substance, and only 1% of sugar, so that the loss in sugar will amount only to 0.15% of the weight of the beets against 0.4 to 0.6% with good diffusion work. Besides the undeterminable sugar losses, which occur frequently with the diffusion process, are impossible with this process, because the juice is instantaneously sterilized while the beets are comminuted.

The thin juice coming from the second press may be used instead of water for making up the lime milk going into the rasping machine. The juice coming from the first mill is completely defecated, almost clear and of light color. It corresponds in purity and appearance with the diffusion juice coming from the filter presses after the first carbonation, but it it about 2° Brix heavier than diffusion juice. The further treatment of the juice thus obtained shall be the following: By adding a little milk of lime, its alkalinity shall be brought to 0.10 to 0.12. The juice is then heated to boiling, and boiled from one to two minutes, and then the alkalinity brought down to 0.01 to 0.02 by means of phosphoric acid or sulfurous acid, or of both acids used simultaneously. The juice is then filtered through mechanical filters as generally used in the sugar industry and then worked up in the usual way. Instead of the acids mentioned, carbonic acid gas can be used, which can be procured without extra expense from the gases of the boiler house.

Instead of the described machinery for comminuting, heating, defecating, neutralizing and pressing, other suitable machinery may be used.

The advantage of this process compared with the diffusion process are as follows:—
1. Instantaneous sterilization of the juice in the comminuted beets. 2. Only 25% to 30% of water is required against about 200%. 3. There are no waste waters, and consequently no loss of sugar and other substances by such water. 4. The loss of sugar is about 0.15% of weight of beets against 0.4 to 0.6%. 5. There are no undeterminable sugar losses. 6. The operation of comminuting, defecating, neutralizing and pressing, requires about 10 minutes with single, and about 15 minutes with double pressing, against over 2 hours for diffusion carbonation and first filtration. 7. The feeding value of the pulp is much higher and it is much dryer, so that a drying plant has to evaporate only 1/5 of the water that has to be removed from diffusion pulp. 8. The juice is about 2° Brix heavier. 9. There is a saving of 2% to 2½% of lime. 10. I dispense with the lime kiln, carbonation and filter press plant. 11. The loss of sugar in filter press cakes is saved. 12. The steam used with diffusion is saved. 13. The cost of plant and working expenses are much lower than with diffusion, lime kiln, carbonation and filter presses.

I am aware that it is not new to introduce a defecating agent into finely comminuted sugar beets and I do not claim this step broadly as my invention, but only in combination with the described subsequent steps with which it forms a complete new process.

Having thus fully described my invention, what I claim as new and desire to secure by Letters Patent, is:—

1. The process herein described for complete defecation, neutralization and purification of juice in sugar beets before said juice is extracted, in one continuous operation and under elimination of carbonation and filter-press work, said process consisting in re-conducting to limed beet mush and mixing therewith continuously for thinning purposes, some of the defecated and neutralized juice, heating the mixture to 60–65° C, then neutralizing the excess of lime by means of phosphoric acid, heating further to 70–75° C, and finally extracting by pressing the thus defecated, neutralized and purified juice.

2. The process herein described for complete defecation, neutralization and purification of juice in sugar beets before such juice is extracted, in one continuous operation and under elimination of carbonation and filter press work, said process consisting in re-conducting to limed beet mush and mixing therewith continuously for thinning purposes, some of the defecated and neutralized juice, heating the mixture to 60–65° C, then neutralizing the excess of lime by means of phosphoric acid, heating further to 70–75° C, extracting by pressing the thus defecated, neutralized and purified juice, then treating the extracted juice by adding a small amount of lime thereto, then heating the juice to the boiling point, and finally neutralizing and filtering said juice.

In testimony whereof I have hereunto set my hand in presence of two subscribing witnesses.

MORIZ WEINRICH.

Witnesses:
F. A. DE MEUROH,
JAMES S. FITCH.